April 17, 1934.   G. W. NAFTEL ET AL   1,955,308
SIPHONIC FERTILIZER APPLICATOR
Filed June 25, 1932
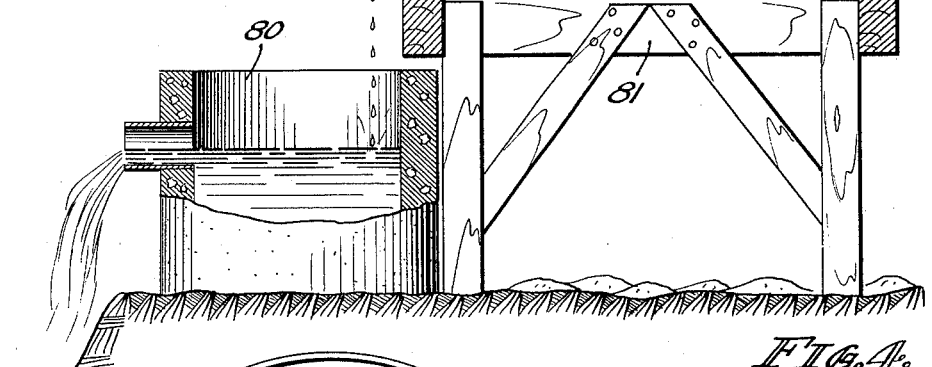
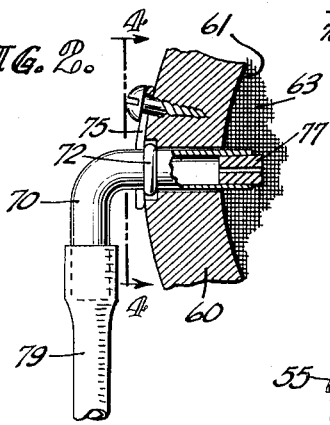
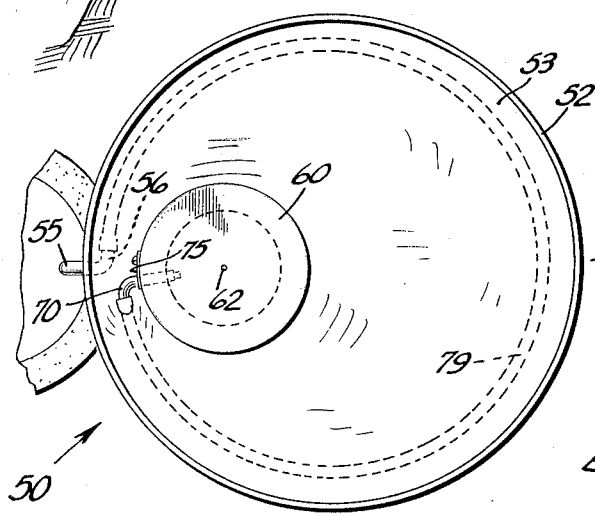
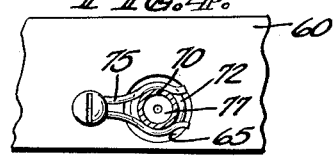
INVENTORS
GEORGE W. NAFTEL
GEORGE R. ROE
BY
ATTORNEY Patented Apr. 17, 1934

1,955,308

UNITED STATES PATENT OFFICE 1,955,308

SIPHONIC FERTILIZER APPLICATOR

George W. Naftel, Ontario, and George R. Roe, Pomona, Calif.

Application June 25, 1932, Serial No. 619,268

2 Claims. (Cl. 137—21)

Our invention relates to liquid dispensing apparatus, and more particularly to such apparatus as is used for feeding liquid fertilizer into water which is to be used for irrigating orchards and the like.

It has been found that the most effective method of applying fertilizer to trees, plants, and the like, is to mix a certain quantity of liquid fertilizer with the irrigation water. This method greatly reduces labor as the fertilizer can be mixed with the water at a single point before the water is distributed to the trees or plants. The use of liquid fertilizer also insures rapid uniform penetration of the nitrates to the roots of the trees or plants. The present means for feeding liquid fertilizer into irrigation water includes a suitable tank provided with a valve for controlling the flow of liquid. Such valves must be frequently adjusted to insure a constant rate of flow due to the continual changing of the quantity of fluid within the container.

An object of our invention is to provide a liquid fertilizer feeding apparatus which is adapted to feed the liquid at a constant rate regardless of the level of fluid within the container.

A further object of our invention is to provide a feeding apparatus in which the rate of flow can be regulated to any desired constant without the use of a secondary device, such as a float valve, or other regulating means.

Further objects and advantages will be made manifest in the following description taken in connection with the accompanying drawing, in which:

Fig. 1 is a vertical sectional view of a preferred form of our invention.

Fig. 2 is an enlarged, fragmentary, horizontal sectional view taken on the line 2—2 of Fig. 1.

Fig. 3 is a plan view of the apparatus shown in Fig. 1.

Fig. 4 is a sectional view taken on the line 4—4 of Fig. 2.

Referring specifically to the drawing, we have shown therein a liquid fertilizer feeding apparatus 50, comprising a preferred form of our invention, includes a suitable container 52 which is adapted to receive liquid fertilizer 53. Positioned adjacent the bottom of the container 15 is a discharge spout 55 which is downwardly bent at a point outside the container while the portion of the spout 55 disposed within the container 15 is horizontally bent, as shown in Fig. 3, to provide a nipple 56 which is substantially parallel with the wall and bottom of the container 15.

Adapted to float on the surface of the liquid 53 within the container 52 is a float 60 which has a cavity 61 on the underside thereof and a small vent hole 62 communicating with the atmosphere. The cavity 61 is covered by a suitable screen 63. Formed in the float 50 so as to communicate with the cavity 61 is a horizontal hole 65, the latter being adapted to rotatably receive one end of a tubular elbow 70 which is provided with an annular bead 72. The elbow is secured to the float 60 by a spring clip 75, shown clearly in Figs. 2 and 4, which contacts the bead 72 as shown. The elbow 70 is provided with a plug 77 which is identical with the plug 38 hereinabove described. The elbow 70 is connected to the discharge spout 55 by a flexible tube 79, the latter being helically disposed as shown.

In practice the preferred apparatus 50 of our invention is supported over an irrigation stand pipe 80 by a suitable base 81, as shown in Fig. 1, the container 52 being positioned so that the spout 55 is vertically disposed over the stand pipe 80. When desirable to feed liquid fertilizer into the stand pipe 80, shown in Fig. 1, the container 52 is filled with the liquid 53, so that the float 60 rests upon the surface of this, as shown in this figure. The liquid then passes through the screen 63, fills the cavity 61, and flows through the plug 77 into the elbow 70, from which it gravitates through the tube 79 and out of the spout 55 into the stand pipe 80. The tube 79 and spout 55 have internal diameters which are sufficiently large so that liquid cannot back up in the tube 79.

The rate of flow of liquid through the spout 55 can be varied as desired by providing a number of the plugs 77 having different sized discharge openings. It is clear that the apparatus 50 will feed the fertilizer 53 into the stand pipe 80 at a constant rate of flow regardless of the level of liquid within the container 52, as the head of liquid above the elbow 70 is constant.

It is seen that we have provided an applicator for liquid fertilizer which is extremely simple in structure and operation, and which includes no valves or other intricate devices which might be injured by the corrosive nitrates which are usually present in soluble fertilizers. The apparatus of our invention need only be supplied with fertilizer and can be depended upon to feed this fertilizer into irrigation stand pipes or ditches at a uniform rate without being attended.

It is further desired to call attention to the fact that it is particularly desirable to provide the screen on the bottom of the float so that liquid will rise upward to enter the cavity or recess 61. The fertilizer used in our device frequently contains a quantity of small fibers which rub off the bags in which the fertilizer is packaged. With a screen on the bottom of the float, gravity greatly assists in keeping the screen free from such an accumulation of these fibers as would interfere with an adequate flow of liquid through the screen.

What we claim is:

1. In a fertilizer solution dispensing apparatus, the combination of: a tank; a discharge fitting providing a passage through a wall of said tank adjacent the bottom thereof; a flat float comprising a relatively flat block of wood and supported on the surface of liquid in said tank, there being a cavity formed upwardly in the lower face of said float to form a filter chamber; a pipe rotatably mounted on said float beneath the level of said liquid, the inner end of said pipe extending inwardly opposite said chamber; a weir mounted upon the inner end of said pipe; a screen enclosing the lower end of said chamber and confining said weir therein; and a tube flexibly connecting the outer end of said pipe with said fitting, said pipe being adapted to rotate as said level is lowered to prevent said tube affecting the balance of said float as said float rests upon said liquid.

2. In a fertilizer dispensing apparatus, the combination of: a tank; a discharge fitting providing a passage through a wall of said tank adjacent the bottom thereof; a flat float comprising a relatively flat block of wood and supported on the surface of liquid in said tank, there being a cavity formed upwardly in the lower face of said float to form a filter chamber; a pipe mounted on said float beneath the level of said liquid, the inner end of said pipe extending inwardly opposite said chamber; a weir mounted upon the inner end of said pipe; a screen enclosing the lower end of said chamber and covering the inner end of said pipe; a tube flexibly connecting the outer end of said pipe with said fitting; and means forming a bearing on said float to permit the outer end of said pipe to which said tube is connected to rotate relative to said float to prevent said tube affecting the balance of said float as said float rests upon said liquid.

GEORGE W. NAFTEL.
GEORGE R. ROE.